United States Patent [19]
Young et al.

[11] Patent Number: 5,497,886
[45] Date of Patent: *Mar. 12, 1996

[54] SCREENING APPARATUS FOR PAPERMAKING PULP

[75] Inventors: Douglas L. G. Young, Nashua; Antoine G. Abdulmassih, Hudson, both of N.H.

[73] Assignee: Ingersoll-Rand Company, Woodcliff Lake, N.J.

[*] Notice: The term of this patent shall not extend beyond the expiration date of Pat. No. 5,307,939.

[21] Appl. No.: 46,319

[22] Filed: Apr. 15, 1993

Related U.S. Application Data

[63] Continuation-in-part of Ser. No. 912,462, Jul. 13, 1992, Pat. No. 5,307,939.
[51] Int. Cl.$^6$ .................................................. B07B 1/22
[52] U.S. Cl. .......................... 209/270; 209/273; 209/281; 209/413; 210/415
[58] Field of Search .................................. 209/273, 413, 209/415, 270, 281; 210/413, 414, 415

[56] References Cited

U.S. PATENT DOCUMENTS

| 4,188,286 | 2/1980 | Holz | 209/273 |
| 4,200,537 | 4/1980 | Lamort | 210/415 |
| 4,356,085 | 10/1982 | Schön et al. | 209/273 |
| 4,676,903 | 6/1987 | Lampenius et al. | 210/413 |
| 5,000,842 | 3/1991 | Ljokkoi | 209/273 |
| 5,147,543 | 9/1992 | Frejborg | 209/273 X |
| 5,172,813 | 12/1992 | Ljokkoi | 209/273 X |
| 5,176,261 | 1/1993 | Holz | 209/273 |
| 5,192,438 | 3/1993 | Frejborg | 209/273 X |
| 5,307,939 | 5/1994 | Young et al. | 209/273 X |

Primary Examiner—William E. Terrell
Assistant Examiner—Dean A. Reichard
Attorney, Agent, or Firm—Robert F. Palermo; Michael H. Minns

[57] ABSTRACT

A hydrodynamic device for generating negative pressure excursions in a pulp slurry during fine screening, includes a plurality of half-foil members disposed on a substantially cylindrical outer surface of a rotor. The rotor is mounted within and co-axial with a substantially cylindrical screen having a circumferentially continuous apertured zone to define an annular screening chamber between the rotor and the screen. The half-foil members are collectively at least axially co-extensive with the apertured zone and have a leading edge which, also collectively, is inclined at a spiral angle relative to the axis of the rotor such that during rotation, the collective leading edge of the half-foil members conduct large particles downwardly through the screening chamber. A selection of hydrodynamic foil configurations is provided in order to adapt to a wide range of pulp types and screening conditions.

30 Claims, 5 Drawing Sheets

SCREENING APPARATUS FOR PAPERMAKING PULP

This is a continuation-in-part of application Ser. No. 07/912,462 filed Jul. 13, 1992 now U.S. Pat. No. 5,307,939.

BACKGROUND OF THE INVENTION

This invention relates generally to machinery for screening paper-making pulp and more particularly to a screening apparatus having an enhanced rotor for promoting screening efficiency together with power conservation.

The quality of pulp is, to a large extent, determined by its freedom from contamination with shives, woody particles, dirt, and coarse fibers.

Shives and woody particles are usually small fiber bundles which are held together by a small amount of undigested lignin. Their presence to excess in commercial pulp results in reduced value and may cause downgrading of the pulp.

Dirt may be of organic or inorganic composition. Inorganics include small pieces of sand or other grit, while organics may be residual particles of bark or pitch agglomerations. Typically, these are visible to the unaided eye and are usually of a different color from the pulp. Since they all have various adverse effects, they also cause downgrading of the pulp and a consequent reduction of value.

The presence of any or all of these is undesirable, and many techniques for their separation have been developed with widely varying operating success records. These usually involve screening performed in a chamber in which relative motion is created between the screen and some agitation device such as a rotor or a hydrodynamic foil, one of which may be movable. The most common shortcomings of available separation machines are their inability to remove sufficient shives without also removing an undesirable quantity of good fiber; the tendency to block the screen with anything other than the lowest consistency of pulp; the tendency for the liquid component of the pulp suspension to pass more readily than the fibers through the screen, resulting in a progressive increase of consistency from the pulp feed to rejects discharge which results in unstable operation of the screening apparatus; the damage and wear caused to the screen and rotor by coarse particles caught between them; the consumption of excessive power for supplying the pulp and for screening; and the progressive damage to the pulp fibers caused by dissipation of the excessive energy used in the process.

Ideally, a screening apparatus would remove all shives and foreign particles from high consistency pulp without any of the good fibers being lost; without requiring any addition of dilution liquor; and without more than the minimum consumption of energy. In reality, employment of a screen with perforations fine enough to remove all undesirable material usually results in frequent screen blockages and possibly even jamming of the pulp between the rotor and the screen. Use of a screen coarse enough to prevent blocking and jamming usually results in accepting nearly all the undesirable particles. To avoid both of these objectionable results, screen aperture sizes are chosen to be slightly larger than that at which unstable operation occurs. To minimize unstable operation, agitation is provided to ensure that fibers pass individually through the screen apertures, and screen-plate cleaning is typically provided by backwashing accumulated particles out of the apertures.

It has become quite common to use a screen/rotor combination for agitation and for hydrodynamic generation of backwash pulses in a fine screening apparatus. The aperture size, pulse generator form and size, rotor form and speed, and rotor/screen separation, for a given pulp type and consistency, determine the screening behavior. In some cases, positive pressure pulses may be too strong and too long relative to the negative pressure backwash pulses and may result in marginally rejectable fibers being extruded through the screen apertures and passing back and forth through the screen many times. This may damage the fibers by removing secondary fibrils and may result in paper having low strength. It also consumes excessive energy by causing multiple unnecessary screen passes for accepts fiber, which thereby reduces production capacity.

Some machines have a cage type rotor which may consist of one or more hydrodynamic foil members, mounted on support arms which radiate from a rotatable hub, extending axially for the full length of the screen. These generate strong pulses which sweep around the circumference over the full length of the screen with every revolution of the rotor. Such rotors consume excess power due to stirring action on the pulp residing inboard of the foil members. This power is wasted because it does not contribute sufficiently to the screening action.

One improvement to the cage type rotor provides a large diameter hub on which the hydrodynamic foils are mounted on short support arms to reduce the volume of the screening chamber and to reduce specific power consumption.

To reduce the magnitude of the effects described above, many machines are now made with closed rotors, that is, rotors having a full cylindrical surface on which bumps and depressions are directly attached without support arms to generate localized pressure pulsations. Depending upon their specific geometries, these may offer lower specific power consumption than cage rotors; and, because the bumps and depressions are distributed over the rotor surface, the pressure pulsations are distributed about the screen plate surface and do not concentrate alternating stresses along the aperture pattern.

Although these and other modifications have improved screening economics, there is still room for very significant improvement in screening before diminishing-returns sets in. For example, depending on the pulp characteristics in the particular pulp line, it is possible to tailor the numbers, shapes, locations, and sizes of the bumps and depressions to provide pulses of different durations, intensities, frequencies, and shapes which maximize screening efficiency and discrimination ability while reducing or minimizing power consumption.

Until these improvements are realized, fine screening efficiency will be less than desired, and pulp quality will suffer because of failure to remove a sufficient portion of objectionable material. In addition, the waste of good fiber due to its removal with rejects, the damage to fiber quality attributable to excessive mechanical working, and the excessive consumption of power (due to redundant stirring and to excessive dilution required to overcome thickening of the pulp) imposes a significant cost on the pulp making process.

The foregoing illustrates limitations known to exist in present fine screening apparatus. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a hydrodynamic device for generating negative pressure excursions in a pulp slurry during fine screening, including a plurality of half-foil member disposed on a substantially cylindrical outer surface of a rotor, the rotor being mounted within and co-axial with a substantially cylindrical screen having a circumferentially continuous apertured zone to define an annular screening chamber between the rotor and the screen, the half-foil members being so arrayed as to sweep across the full axial extent of the apertured zone on the screen with each revolution of the rotor.

The foregoing and other aspects will become apparent from the following detailed description of the invention when considered in conjunction with the accompanying drawing figures.

DETAILED DESCRIPTION

Figure 1:
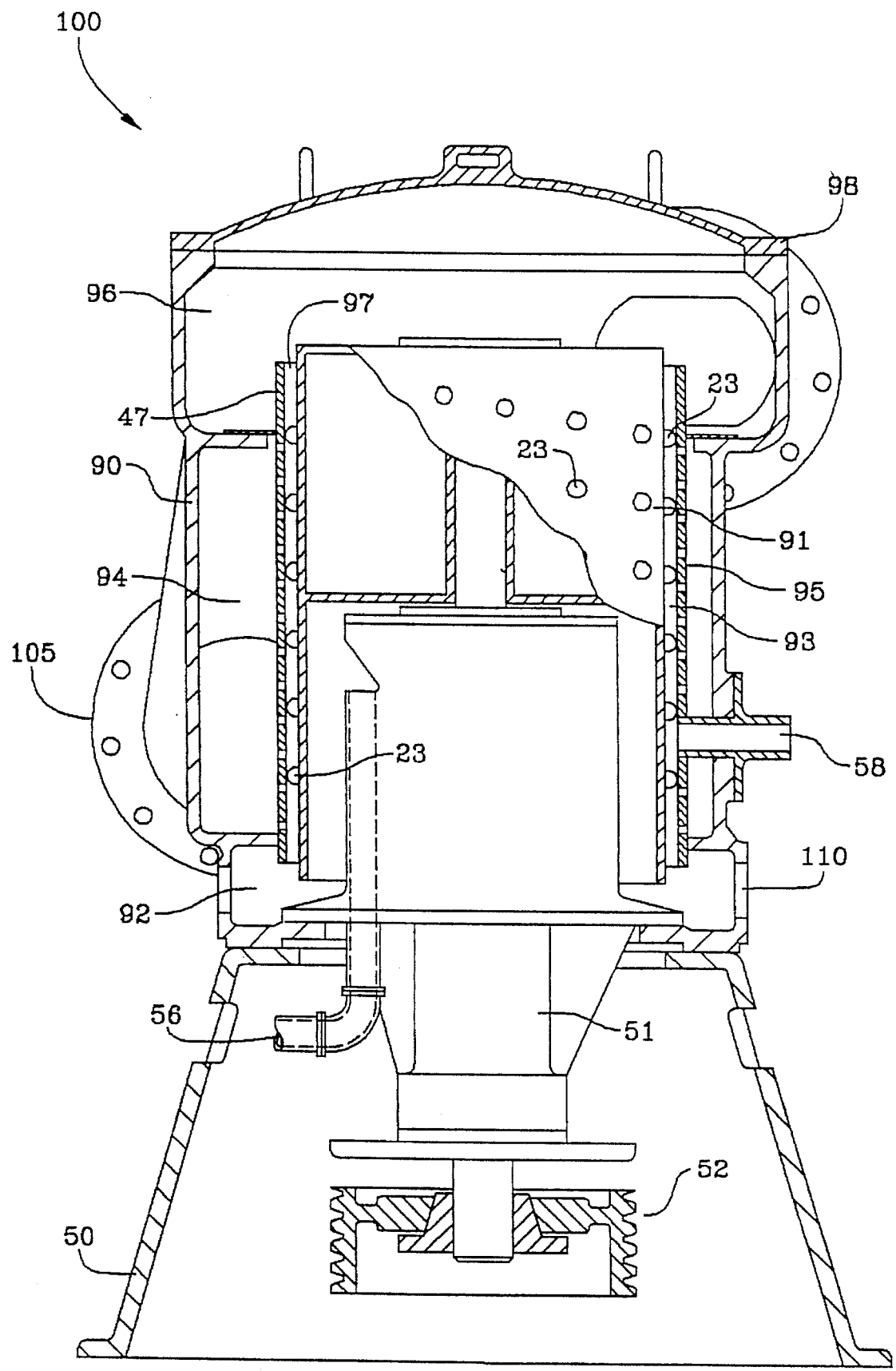
FIG. 1 is a cross-sectional partially fragmentary schematic elevation view illustrating a generalized embodiment of a pulp fine-screening device and the overall structure of a typical such machine.

Referring to FIG. 1, common features of pulp fine-screening equipment can be seen. A screening apparatus 100 is made up of a base 50 upon which housing 90 is mounted. (The apparatus shown here is vertically oriented, but it is known that screening apparatus may be in any orientation between horizontal and vertical.) Housing 90 has an end mounted inlet chamber 96 with a pulp inlet 98 through which pulp is tangentially fed for screening. The pulp flows around and over inlet wall 47 into pulp entrance 97 which is defined by the annular space between the portion of rotor 91 projecting above the perforated portion of screen 95 and inlet wall 47. Rotor 91 has a closed top, a generally cylindrical surface, and, on the portion of the rotor adjacent to the perforated portion of screen 95, in most cases, one or more projections 23 or other surface irregularities for generating negative pressure pulsations. These are intended to help prevent blocking the screen by causing momentary flow reversals through the perforations of the screen 95. The annular space between rotor 91 and screen 95 defines screening chamber 93, while the space outboard of the screen 95 contains accepts chamber 94 which is drained by accepts discharge 105. Below accepts chamber 94 and screening chamber 93 is rejects chamber 92 which empties through rejects discharge 110. Rotor 91 is rotated by a shaft which extends through a sealed center column 51 and which is driven by a prime mover (not shown) through drive pulley 52. Dilution inlets 56 and 58 are also shown. Elimination of one or both of these dilution inlets is one of the purposes of the present invention.

Figure 2A:
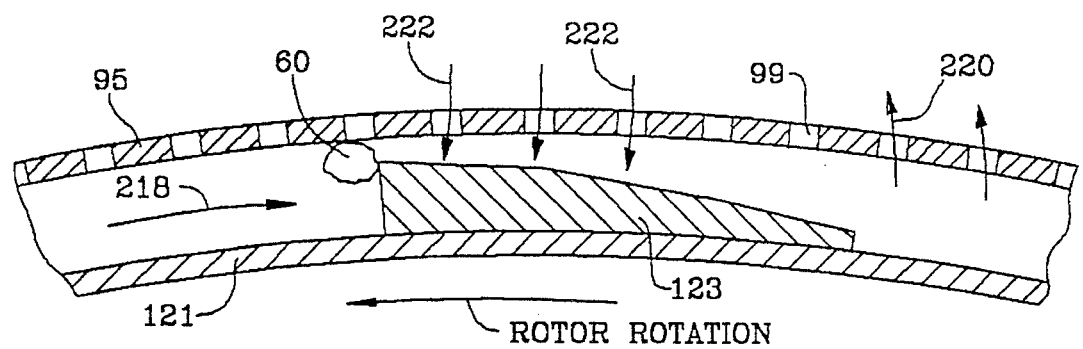
FIG. 2a is a cross-sectional fragmentary plan view of a rotor similar to that of FIG. 1 illustrating the relationship between the rotor surface, one possible projection profile, and the screen.

Rotor 121 is seen from above in FIG. 2a. Screen 95 has apertures 99 through which accepted fiber along with pulp liquor has a normal outflow 220. Because of the rotation of rotor 121, half-foil 123 has a relative velocity 218, with respect to the pulp being treated, lower than its absolute velocity. Note that the terms "foil" and "half-foil" are used interchangeably, throughout, to denote the same surface projections. This is due to the tangential velocity of the pulp within the screening chamber as a result of the stirring action of the half-foil members 123 on the pulp. FIG. 2a demonstrates the operation of the invention. The relative velocity 218 generates a pressure excursion at the screen plate due to a venturi-like effect between foil 123 and screen 95. It begins with a rapid pressure increase immediately prior to the passage of the leading edge of the foil. This is immediately followed by a precipitous pressure drop which gradually tapers back to the equilibrium positive pressure for the screening chamber. This results in a peak negative pressure occurring near the zone of closest proximity between foil 123 and screen plate 95. When superimposed on the constant positive pressure attributable to feed pressure plus height of the slurry above that point on the screen and to the centrifugal force of the circumferential flow of the pulp slurry, the result is a flow reversal which converts outflow 220 into backflow 222. This tends to flush coarse fiber bundles and other particles from the apertures of the screen 95 and to break-up screen blinding caused by entangled fibers. In addition, it also returns pulp liquor having a reduced fiber content to the screening chamber and thereby prevents thickening. This maintains screening efficiency without the need for the addition of dilution liquid.

Another feature of this embodiment is seen in FIGS. 2a by considering large scale contaminant (or particle) 60 and its interaction with foil 123. The collective spiral angle of the leading edge tangents of the half foils facilitates rapid downward transport of such contaminants because it does not require any changes of direction and the leading edge of foil 123 is snag-free and smooth. Note that the leading edge of the foil is preferably flat and radially oriented so that it does not tend to push large scale contaminants against the screen where they cause wear and damage and impede rotor motion.

The character of the surface of screen 95 (in FIG. 2) has an important effect upon the efficiency of the screening unit. Screens may be made with round, slot-like, beveled, or funnel-shaped apertures, and some are made with axial grooves in which apertures are arrayed along the deepest line thereof. These are commercially available as smooth surface, dimpled surface, irregular surface ("Lehman" grooved), Vee grooved surface, or profiled surface ("Ahlstrom" profile) screens. These are illustrated in FIGS. 2b–2g. The screen surface affects the required arrangement of half-foils on the rotor drum; because the slip velocity, the speed of the pulp relative to the rotor surface, is proportional to the screen surface roughness, since increased drag from the stationary screen slows the pulp relative to the rotor.

Figure 3:
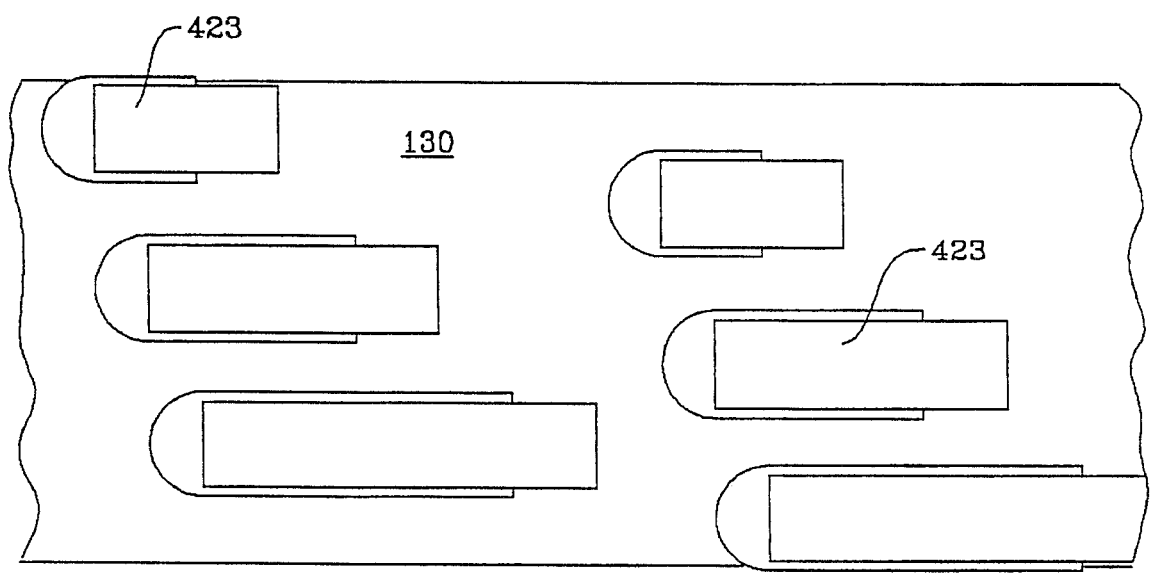
FIG. 3 is a view of an embodiment showing an array of pulse-generating rotor surface projections of varying size.
Figure 2B:
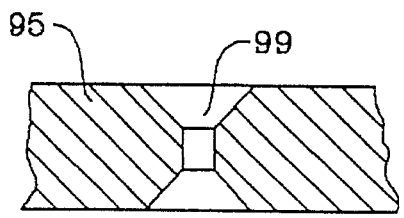
Figure 2C:
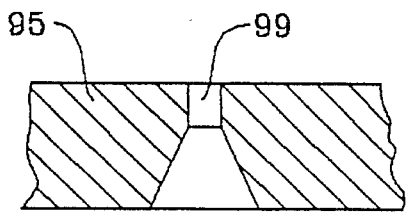
Figure 2D:
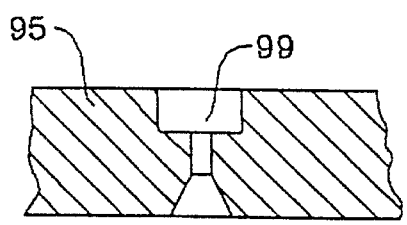
Figure 2E:
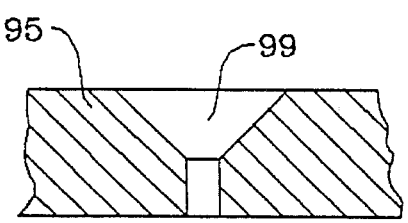
Figure 2F:
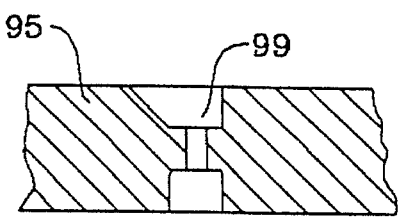
Figure 2G:
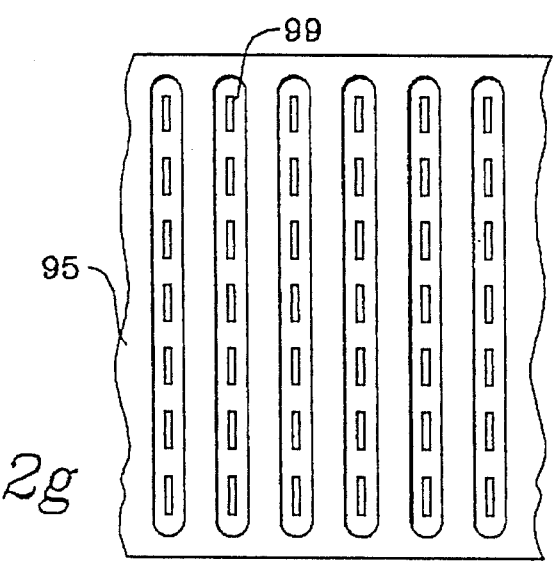

FIG. 3 is a planar schematic view of a rotor surface showing another embodiment of the pulse generating projections of the present invention. Here, the projections or half-foils 423 are separate ramp-like protuberances and have a small axial extent on rotor surface 130. The semi-cylindrical leading edges of the half-foils each have a point of tangency to a spiral line projected onto the surface of the rotor so that, collectively, they describe a spiral inclination angle. These foil members are shown extending for different circumferential distances on the rotor surface to show a possible method of increasing the duration of the backwash pulses and also to illustrate the many possible forms and combinations which may be employed. In all cases, the leading edges of the foils project radially the greatest distance and taper down to the rotor surface, or even below the surface, at the trailing edges.

Figure 4A:
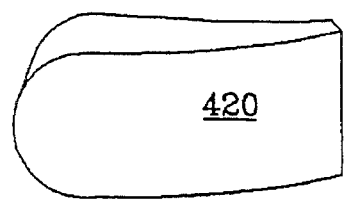
FIGS. 4a–4g show several different configurations of pulse-generating surface projections which can be used to vary the pulse characteristics as required by pulp properties.
Figure 4B:
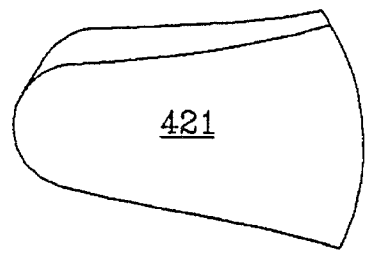
Figure 4C:
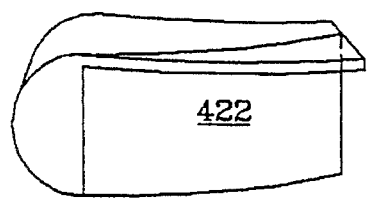
Figure 4D:
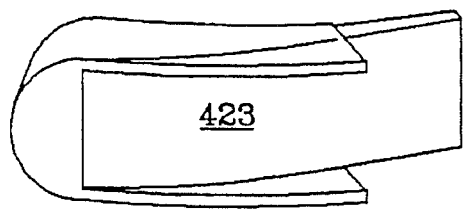
Figure 4E:
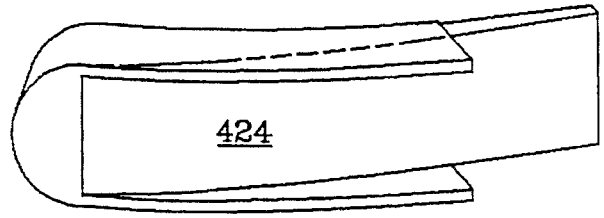
Figure 4F:
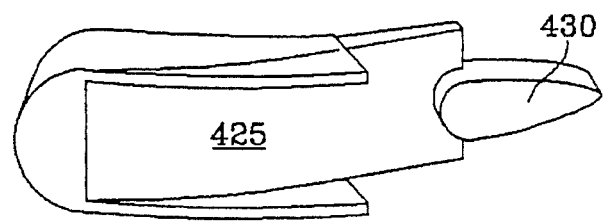
Figure 4G:
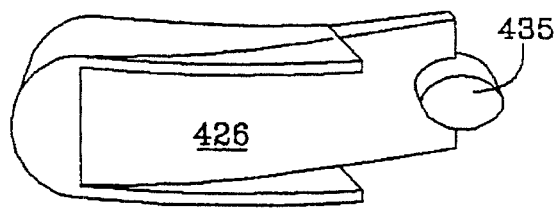

A number of geometries for this embodiment are illustrated in FIGS. 4a–4g. In all cases, the leading-edge of the foil is substantially radially straight and perpendicular to the rotor surface as in the other embodiments described. In the axial direction, the half-foil leading-edge is rounded to shed any large scale contaminants either upward or downward to prevent wedging between the screenplate and the protuberance. The net downward flow of pulp slurry due to feed pressure transports these large scale contaminant particles downward through the screening chamber. FIG. 4a shows a foil 420 which causes a screen flow reversing pulse and creates mixing vortices at its trailing-edge due to axial flow of pulp into the low pressure zone behind the foil. Foil 421, in FIG. 4b, is fan shaped to increase the axial extent of the mixing vortices and to maintain the axial extent of the pulse while foil 422, in FIG. 4c, has a constant height barrier (or fence) along its upper edge to limit the amount of downward flow into the mixing vortices, hence, to reduce pulse attenuation and to maintain pulse pressure amplitude. The fence can be provided on the lower edge, as well, if the operating conditions warrant, or on both edges as in the cases of foils 423, 424, 425, and 426 shown in FIGS. 4d, 4e, 4f, and 4g. The two fence configuration causes the screen flow reversing pulse to last longer by delaying the axial inflow of pulp into the mixing vortices until passage of the trailing-edge of the half-foil. Excessive eddy-currents and intermixing behind the foils can be reduced by incorporation of flow dividers 430 and 435, as seen in FIG. 4f and 4g. These occupy space in the vortex regions to reduce the vigor of mixing.

Figure 5:
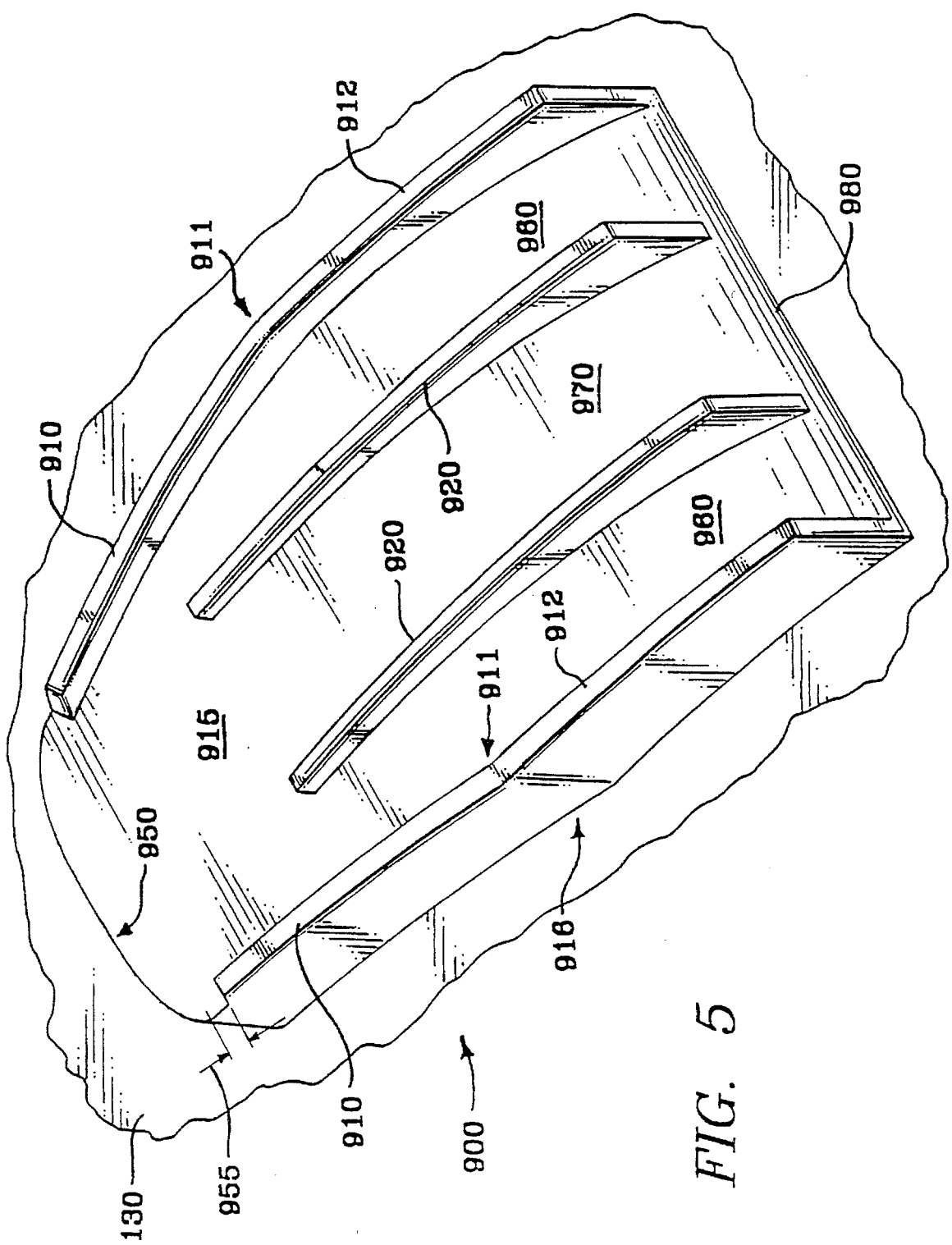
FIG. 5 is a schematic perspective view showing a surface projection foil of the present invention.

FIG. 5 shows a schematic view of the preferred embodiment of the foil 900 of the present invention. This resembles a combination of foils 421 and 423 of FIG. 4, with some very apparent differences, as will be described. Foil body 915 has a substantially radially straight leading-edge 950 which is perpendicular to the rotor surface 130 or slightly inclined in the direction of travel of the rotor surface. This inclination urges coarse particles away from the screen and toward the rotor surface 130 to reduce screen wear and drag.

Foil body 915 has the greatest radial height at its leading portion and tapers smoothly to a minimum height at its trailing edge 980. The leading edge 950 of foil body 915 is a substantially smooth arc which subtends about a 60° angle between the upper and lower axial boundaries of the arc. From the upper and lower axial boundaries of leading edge 950, the axial edges of foil body 915 diverge from a circumferential path by approximately 15° to 20° along a substantially straight path to a transition region 916, where they become parallel along circumferential paths.

Figure 6:
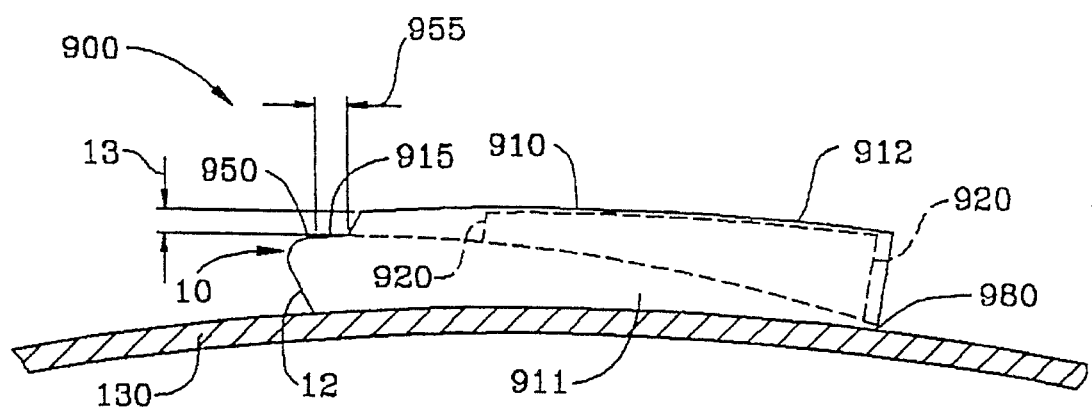
FIG. 6 is a lateral elevation view of the foil of the present invention.

Fences 910 project radially outwardly from the axially upper and lower edges of foil body 915, beginning at a setback distance 955 from the axially upper and lower boundaries of The embodiments shown in FIGS. 2, and 6 all operate on the same principle, namely the venturi-like effect producing a low-pressure region due to the relative motion between the half-foil and the pulp next to the screen. This low-pressure region effectively travels around the screen causing a travelling flow reversal backwash wave through the screen to clear blockages due to coarse particles and agglomerates, shives, and pulp mat formation. In all embodiments, provision is made for circumferential distribution of the pressure reversal pulsations to avoid undue stressing of the screen. Because of the controlled timing, duration, and distribution of flow reversals produced by the present invention, self-dilution of the pulp slurry is achieved. This permits operation at increased feed consistency, increased specific capacity, and reduced specific power consumption. The required numbers and configurations of the half-foils (or surface protuberances) discussed are determined for the particular pulp being processed, and, therefore, the several embodiments are presented as equally useful, depending on the particular application. The embodiment which is best for one pulp type may well be less suitable for another.

This invention enhances the efficiency of screening for high consistency pulp by deflocculating and mixing the pulp as it passes through the pulp entrance chamber into the screening chamber, thereby assuring a uniformly dispersed suspension of fibers. Moreover, the generation of backwash flow through the screen apertures by the hydrodynamic foils or protuberances offsets the normal thickening effect of screening by returning a fraction of pulp liquor having a reduced fiber content to the screening chamber. The foils extend a distance along the rotor circumference which is determined by the length of time during which flow reversal is required at the particular location (generally, backflows of longer duration, thus foils of greater length, and or number maybe required at the downstream end of the screening chamber). The magnitude of the pressure reversal and the area of screen affected at any one time may be controlled by the radially outer contour and the axial and circumferential dimensions of the foil on the rotor surface. Because of the collective spiral angle of the foil leading edge, coarse particles are swept downstream through the screening chamber.

The projections are foil-like protuberances having their lifting surface ramp oriented to decrease toward the trailing edge. They may have a fence along the upstream or downstream edge, or both, as well as one or more at an axially intermediate location to control crossflow, enhance mixing, and extend the duration of pressure reversal. The ramp surface profile angle should be such as to avoid boundary layer separation, i.e., stall condition, and to thereby maintain a more uniform amplitude of negative pressure for the desired time duration.

What is claimed is:

1. A hydrodynamic device for generating negative pressure excursions in a pulp slurry during fine screening, comprising:

a plurality of half-foil members disposed on a substantially cylindrical outer surface of a rotor, said rotor being mounted within and co-axial with a substantially cylindrical screen having a circumferentially continuous apertured zone to define an annular screening chamber between said rotor and said screen, at least one said half-foil member having a circumferential extent and a leading edge extending outward from said rotor;

first fence-like means having a leading edge and a trailing edge, said first fence-like means projecting a radial distance outwardly from said rotor and being attached along at least a portion of one or more axial edges of said circumferential extent of at least one half-foil member.

2. The hydrodynamic device of claim 1, wherein said half-foil members are arranged on the rotor to overlap on their circumferential paths.

3. A hydrodynamic device as recited in claim 1 wherein said at least one half-foil member has an outboard surface tapering from a maximum radial dimension at said leading edge to a minimum radial dimension near a trailing edge.

4. A hydrodynamic device as recited in claim 1 wherein said plurality of half-foil members are arrayed so as to sweep across the full axial extent of the apertured zone of the screen with each revolution of said rotor.

5. A hydrodynamic device as recited in claim 1 wherein said plurality of half-foil members have a collective leading edge inclined at a spiral angle relative to the axis of said rotor.

6. The hydrodynamic device as recited in claim 1 wherein said leading edge of said at least one half-foil member forms an essentially acute angle with the surface of said rotor.

7. A hydrodynamic device as recited in claim 1 wherein said at least one half-foil member has an axially arcuate leading edge extending radially outward from said rotor.

8. A hydrodynamic device as recited in claim 7 wherein said at least one half-foil member has an axially arcuate leading edge, flat axially upper and lower edges which diverge upwardly and downwardly, respectively, from upper and lower ends of said leading edge, and flat parallel circumferential edges extending from junctures formed with said divergent edges toward trailing edges of said half-foil members.

9. A hydrodynamic device as recited in claim 1 further comprising intermediate fence-like means having a leading edge and a trailing edge, said intermediate fence-like means projecting a radial distance outwardly from said rotor and being attached at one or more axially intermediate locations on said at least one half-foil member.

10. A hydrodynamic device as recited in claim 9 wherein said intermediate fence-like means is oriented circumferentially with respect to said rotor.

11. A screening apparatus for paper-making pulp comprising:

a housing having a generally cylindrical shape, an axis, a pulp inlet chamber, a screening chamber downstream of said inlet chamber, a rejects chamber and discharge downstream of said screening chamber, an annular accepts chamber outboard of said screening chamber, and an accepts discharge in said accepts chamber;

a rotor having an outer substantially cylindrical surface and an axis co-axial with said housing;

a generally cylindrical apertured stationary screen member also co-axial with said housing and said rotor, said screen member having an inside diameter greater than an outside diameter of said rotor to define said screening chamber in a resulting annular space between said screen member and said rotor;

a plurality of half-foil members disposed on the outer surface of said rotor, at least one said half-foil member having a circumferential extent and a leading edge extending outward from said rotor; and first fence-like means having a leading edge and a trailing edge, said first fence-like means projecting a radial distance outwardly from said rotor and being attached to said at least one half-foil member.

12. In a pulp fine screening apparatus of the type having a substantially cylindrical rotor rotatably mounted coaxially within a substantially cylindrical apertured screen plate and defining a pulp screening chamber in an annular space between said rotor and said screen plate, the improvement in combination with said rotor, comprising:

a plurality of half-foil members mounted on said rotor and projecting radially therefrom into said pulp screening chamber, said half-foil members projecting to the largest radial extent near a leading edge and tapering therefrom to a smallest radial extent near a trailing edge of said half-foil member; and first fence-like means, attached to upper and lower axial edges of said half-foil members and projecting a radial distance outwardly from said rotor, for limiting axial flow of a pulp slurry into low pressure zones between said half-foil members and said screen plate.

13. The combination of claim 12, wherein said half-foil members have axially arcuate leading edges, flat axially upper and lower edges which diverge upwardly and downwardly from the upper and lower axial ends of said leading edges, and flat parallel circumferential edges extending from junctures with said divergent edges toward trailing edges of said half-foil members.

14. A hydrodynamic device for generating negative pressure excursions in a pulp slurry during fine screening, comprising:

a plurality of half-foil members disposed on a substantially cylindrical outer surface of a rotor, said rotor being mounted within and co-axial with a substantially cylindrical screen having a circumferentially continuous apertured zone to define an annular screening chamber between said rotor and said screen;

at least one said half-foil member having an axially arcuate leading edge extending radially outward from said rotor and a circumferential extent.

15. A hydrodynamic device for generating negative pressure excursions in a pulp slurry as recited in claim 14 wherein said at least one half-foil member has an outboard surface tapering from a maximum radial dimension at said leading edge to a minimum radial dimension near a trailing edge.

16. A hydrodynamic device for generating negative pressure excursions in a pulp slurry as recited in claim 14 wherein said plurality of half-foil members are arrayed so as to sweep across the full axial extent of the apertured zone of the screen with each revolution of said rotor.

17. A hydrodynamic device for generating negative pressure excursions in a pulp slurry as recited in claim 14 wherein said plurality of half-foil members have a collective leading edge inclined at a spiral angle relative to the axis of said rotor.

18. A hydrodynamic device as recited in claim 14 further comprising first fence-like means having a leading edge and a trailing edge, said first fence-like means projecting a radial distance outwardly from said rotor and being attached along at least a portion of one or more axial edges of said circumferential extent of at least one half-foil member.

19. A hydrodynamic device for generating negative pressure excursions in a pulp slurry as recited in claim 14 further comprising intermediate fence-like means having a leading edge and a trailing edge and being attached along at least a portion of one or more axially intermediate locations on said at least one half-foil members.

20. The hydrodynamic device as recited in claim 19 wherein said intermediate fence-like means tapers from a minimum radial dimension at said leading edge to a maximum radial dimension at said trailing edge.

21. A hydrodynamic device as recited in claim 19 wherein said intermediate fence-like means is oriented circumferentially with respect to said rotor.

22. A hydrodynamic device for generating negative pressure excursions in a pulp during fine screening, comprising:

a plurality of half-foil members disposed on a substantially cylindrical outer surface of a rotor, said rotor being mounted within and co-axial with a substantially cylindrical screen having a circumferentially continuous apertured zone to define an annular screening chamber between said rotor and said screen; said half-foil members having a collective leading edge inclined at a spiral angle relative to the axis of said rotor;

at least one said half-foil member having a leading edge extending outward from said rotor and a ramp-like outboard surface tapering from a maximum radial dimension at said leading edge to a minimum radial dimension near a trailing edge; and intermediate fence-like means having a leading edge and a trailing edge, said intermediate fence-like means projecting a radial distance outwardly from said rotor and attached at one or more axially intermediate locations on said at least one half-foil members.

23. The hydrodynamic device as recited in claim 22 wherein said intermediate fence-like means tapers from a minimum radial dimension at said leading edge to a maximum radial dimension at said trailing edge.

24. The hydrodynamic device as recited in claim 22 wherein said leading edge of said at least one half-foil member is substantially perpendicular to the surface of said rotor.

25. The hydrodynamic device as recited in claim 22 wherein said leading edge of said at least one half-foil member forms an essentially acute angle with the surface of said rotor.

26. The hydrodynamic device as recited in claim 22 wherein said at least one half-foil member has an axially arcuate leading edge, flat axially upper and lower edges which diverge upwardly and downwardly, respectively, from upper and lower ends of said leading edge, and flat parallel circumferential edges extending from junctures formed with said divergent edges toward trailing edges of said half-foil members.

27. The hydrodynamic device as recited in claim 22 wherein said half-foil members are arrayed so as to sweep across the full axial extent of the apertured zone of the screen with each revolution of the rotor.

28. The hydrodynamic device as recited in claim 22 wherein said intermediate fence-like means allows limited axial flow of pulp slurry into a zone of negative pressure between said half-foil member and said screen.

29. The hydrodynamic device as recited in claim 22 further comprising edge fence-like means having a leading and a trailing edge and attached along at least a portion of one or more axial edges of said at least one half-foil member.

30. The hydrodynamic device as recited in claim 29 wherein said edge fence-like means tapers from a minimum radial dimension at said leading edge to a maximum radial dimension at said trailing edge.

* * * * *